Dec. 12, 1967 P. H. SCHULTE 3,357,097

PROCESS FOR MAKING COMBINATION MAGNETIC HEAD

Filed Nov. 1, 1963 3 Sheets-Sheet 1

INVENTOR
PAUL H. SCHULTE

BY Fisher, Christen, Sabol & Caldwell

ATTORNEYS

PROCESS FOR MAKING COMBINATION MAGNETIC HEAD

Filed Nov. 1, 1963 3 Sheets-Sheet 2

INVENTOR
PAUL H. SCHULTE

BY Fisher, Christen, Sabol & Caldwell
ATTORNEYS

Dec. 12, 1967 P. H. SCHULTE 3,337,097

PROCESS FOR MAKING COMBINATION MAGNETIC HEAD

Filed Nov. 1, 1963 3 Sheets-Sheet 3

INVENTOR
PAUL H. SCHULTE

United States Patent Office 3,357,097

Patented Dec. 12, 1967

3,357,097

PROCESS FOR MAKING COMBINATION MAGNETIC HEAD

Paul H. Schulte, D–9 Gardenia, San Francisco Urb., Rio Piedras, Puerto Rico

Filed Nov. 1, 1963, Ser. No. 320,889
4 Claims. (Cl. 29—603)

The present invention relates to the process of manufacturing magnetic heads of a type adapted to be assembled together in precise tracking alinement. The heads may be accurately, mechanically connected together to perform requisite electrical functions on common or associated magnetic tracks.

Essentially the process produces record-playback heads and erase heads which are indexable together in combinations of erase-record, record-erase-record, or erase-record-erase, it being obvious that record and playback may be used interchangeably herein, or that the record head may be used alternatively as a playback head.

It is well known that in the use of multiple heads, alinement requirements are extremely critical and various schemes have been resorted to in an attempt to resolve both the initial line-up and replacement line-up problems with minimum difficulty. However, these schemes do not resolve problems, such as inaccuracies due to component tolerances and also due to multiple part assembly by different persons at different assembly stations.

It is the principal object of this invention to provide a process whereby heads may be manufactured which will index together to aline their gaps relative to common tracks on the tape to be employed therewith.

The process relates the gap-forming structure to external physical structure in each head with the heads to be joined exhibiting male-female external structure to permit ready "snap-in" or connection wherein the gaps of one head will then relate to the gaps of another head for precise alinement. In each instance the close tolerances are inherently built into the structures through punch and die techniques adapted to inter-relate the gaps to the indexing structures on the various heads with the indexing structure in turn being compatible from head to head.

Working tolerances to, for example, $\pm 0.002''$ are obtained by starting out with a blank and, in successive stages, stamping and drawing the blank to form (without detachment) the gap defining structure and the indexing structure in fixed relation, which relation is maintained in the final product.

With the foregoing in mind, it is among the objects of the present invention to provide a process for making magnetic heads, for use in combination, capable of quick connection in accurate alinement.

It is a further object of the invention to provide a process for building record or playback heads and a process for building an erase head wherein the heads carry male and female mating indexing structure, respectively, related to their own gap defining structure.

A still further object of the invention is the provision of a process for producing external gap indexing structure enabling precise inter-connection of erase and record playback heads for bi-directional tape travel.

It is yet another object of the invention to permit the independent fabrication of erase heads and record and playback heads which will connect together for precise alinement within close tolerances for multiple head usage.

With the foregoing in mind, the invention will now be described in connection with a preferred method of fabricating indexing structure for each of a record, playback and an erase head as illustrated in the accompanying drawing, wherein.

Figure 2:
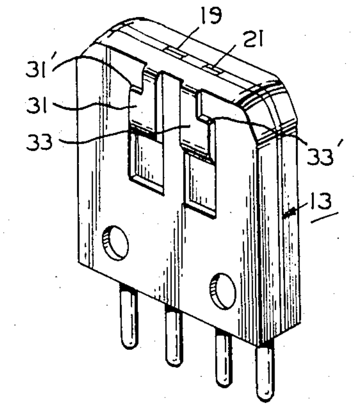
FIG. 2 is a view in perspective of an erase head, per se.
Figure 3:
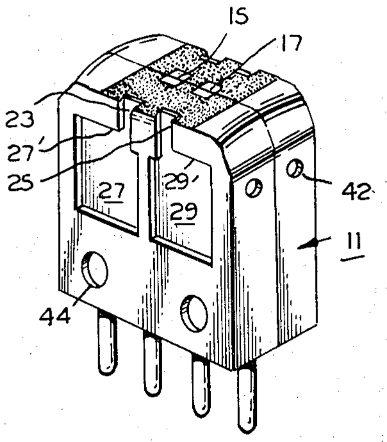
FIG. 3 is a view in perspective of a record or playback head, per se, of the type adapted to inter-connection with the erase head of FIG. 2, as illustrated in FIG. 1.
Figure 1:
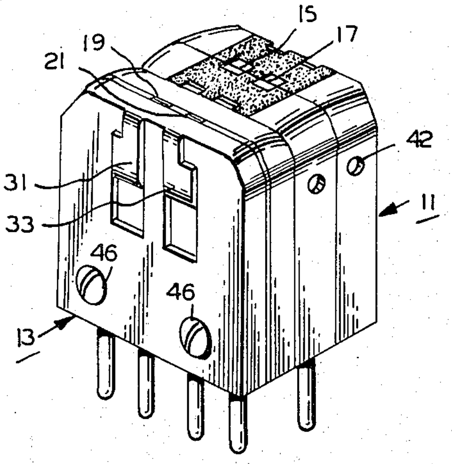
FIG. 1 is a view in perspective of an erase head assembled in operative relationship to a record-playback head.

Referring now to the drawing, and particularly to FIGS. 1, 2 and 3, there is illustrated a record head 11 and an erase head 13. In FIG. 1 the two heads are shown connected together in operative relation. Operative relation is defined as alinement of the gaps of the record head 11, which are contained within the pole faces 15 and 17, with the gaps 19 and 21, respectively, of the erase head 13.

This alinement is achieved by constructing the record head 11 with the gap-defining pole faces 15 and 17 in precise alinement with the edges of the associated slots 23 and 25, which also open into the wells 27 and 29 having their edges also useful in the indexing structure. Basically, this is achieved by manufacturing the pole faces out of the material lanced from the slots 23 and 25 with the alinement being maintained through final assembly by the filler material, and also after the pole faces are magnetically separated from the indexed outer surface structure.

The gaps 19 and 21 of the erase head 13 are in alinement with the bosses 31 and 33 and this alinement is established by fixtures or jigs during processing and retained by the filler. The actual dimensions of the gaps 19 and 21, being erase head gaps, are not as critical as record-playback gaps, such as 15 and 17, because the erase gap function is to "clean off" the tape. Therefore, the gaps may be wider and longer. However, in the process of fabricating the head 13, the gap-defining structure for gaps 19 and 21 is an integral U-shaped member disposed to extend beyond the casing of the head 13. It is this portion of the structure which is indexed to the bosses 31 and 33 to establish the alinement of the gaps to these external indexing structure bosses. The internal erase head structure is clearly shown and described in my co-pending application, entitled, Magnetic Erase Head, Ser. No. 320,751, filed concurrently herewith.

It may be noted that the bosses 31 and 33 act as the male parts for junction with the slots 23 and 25 in connection with their associated wells 27 and 29 for receiving the male portions.

The forming of the slots and wells relative to the bosses is controlled by highly accurate dies wherein the contours are related such that the bosses actually snap or "lock" into the slotted wells. It may be noted that the shoulders 31′ and 33′ are adapted for abutment with the edges 27′ and 29′ for vertical height (as viewed in the drawing) alinement, which may be predetermined as desired for the particular application.

After final assembly and encapsulation of the erase head 13, the integral joining portion of the U-shaped gap member between the gaps 19 and 21 is removed in finishing the face of the head to separate the gaps and leave their magnetic fields respectively independent.

Figures 4, 5, 6:
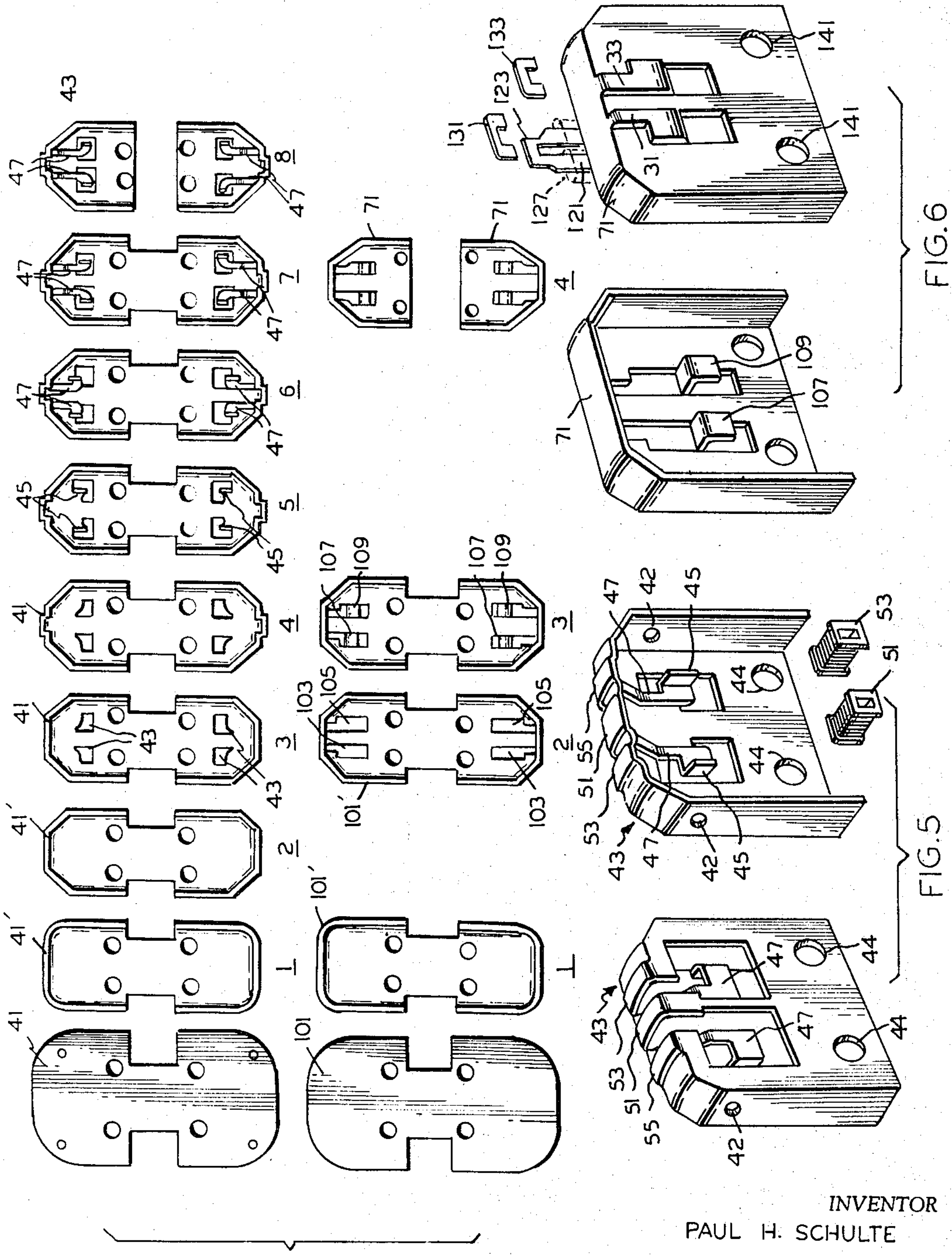
FIG. 4 shows the successive stages or stations in the die formation of the record-playback head along the top row, and the erase head along the lower row.
FIG. 5 is a view in perspective of the inner and outer sides of a record-playback housing as formed in FIG. 4.
FIG. 6 is a similar view of the erase housing.

Viewing now FIG. 4, it will be seen how the indexing shelves and gap forming structures are fabricated employing die techniques. In the upper row, the record head is formed starting with a blank 41 of a high permeability metal. The blank is simply arcuate on both ends and slotted near the central portion to permit the build-up of separate shells, generally as shown at 43 in FIG. 5. The first station of the die forms the inwardly turned peripheral flange 41' to approximate dimension and at station 2, the peripheral flange 41' is processed to dimension. Station 3 reveals the blank 41 as being apertured at the locations 43 which apertures define part of the outline of structure to be developed and also provide tool working room.

Station 4 embosses outwardly the extreme ends of the blank 41 in the area eventually to be considered as the face for the tape contact. The purpose of this assembly is to enable the pole pieces to be isolated when the embossed material is removed.

Station 5 shows the initial lancing operation wherein the corners of the core structures are partially cut from the shell or housing in cantilever fashion and turned upwardly with their ends visible at 45.

Formation of the pole pieces is continued at station 6 wherein the shank outlines 47 for the pole pieces are lanced free of the shell, but generally remain in the plane of the blank. Lancing is continued at station 7 to separate the shanks from the flange material almost to the uppermost periphery (visible edge); also at station 7 forming of the portions separated from the blank at an angle depending approximately 45° from the flange is effected.

Finally, at station 8 the sections are severed and may be reformed as to critical dimensions. The housings 43 from station 8 appear as shown in perspective in FIG. 5 and are ready for assembly of the internal parts and together by pairs to form the record head 11 of FIG. 3.

It will be appreciated tha the processing of the blank 41 into the housings 43 may be achieved in progressive or compound, as well as through single, die stations described.

The pole pieces 47 include the offset inwardly turned lateral sections 45 which are adapted to receive the electrical coils 51, 53 for the magnetic paths to be formed by the pole pieces. Of course when the housings 43 are mated together, the magnetic paths are substantially continuous because the pole piece core sections of one housing abut against the pole piece core sections of the other housing. Lapping is employed, prior to joining the sections, in order that all edges to be abutted lie in the same plane.

The housings also show the small apertures 42 which serve as epoxy keyways when the housings are joined and filled with epoxy, thereby firmly fixing the filling to the shells. The holes 44 are provided for mounting screws which also penetrate the multiple heads to be joined, such mounting screws being shown at 46 in FIG. 1.

Figure 7:
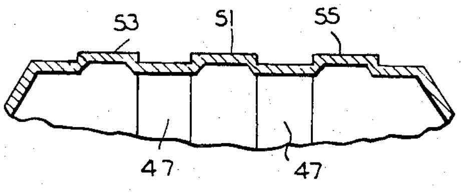
FIG. 7 is a view in section, of the upper surface of the record head of FIG. 5, taken along the final finish plane.

The subject assembly and internal operative components of the recording head are fully described at length in my copending application entitled "Magnetic Head," Ser. No. 320,753, filed concurrently herewith. For purposes of the present description it will suffice to note how the gap supporting structure is related to the external indexing structure. This may best be learned from a consideration of the housings 43 of FIG. 5 with the detailed sectional views of FIGS. 7 and 8.

Also, after assembly and "potting," the forward upper edges of the housings 43 (as viewed in FIG. 5) are lapped until the pole piece shanks 47 appear below the level or plane of the upper surface, depicted between intermediate portion 51 of housing 43 and the outer adjacent portions 53 and 55, all relative to the pole piece

47. This is shown in detail in FIG. 7. The staggered configuration permits the portions 51, 53 and 55 to be finished away, after the housings 43 are joined and their internal components finished in position by encapsulation, because it is then no longer necessary or desirable to retain integral connection between the pole pieces and the housings 43, to maintain alinement relation.

Figure 8:
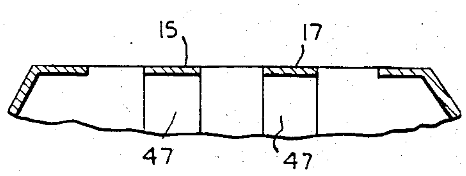
FIG. 8 shows the structure of FIG. 7, as seen along the same plane, but in finished form.

A section through the final head is shown in FIG. 8 to reveal the isolated pole piece 47 which forms the magnetic path for the separated gaps. As finishing of the face of the head 11 progresses, the visible area of the pole pieces 15 and 17 increases until the desired electrical characteristics are attained.

Processing of the erase head is achieved in similar fashion, as shown in FIG. 4, to develop the shells or housings 71 of FIG. 6. Blanks 101, similar to the blank 41, are used as the starting material. Owing to fewer internal components, the erase head may be thinner and here a slightly smaller blank 101 may be employed, or additional lapping may remove excess material from the edges prior to joining thereby realizing the thin configuration of FIG. 2.

In FIG. 4 the operation at the die station 1 is comparable to that of station 1 above, in that the blank 101 is formed with peripheral edges 101'. Since a somewhat simpler arrangement will suffice for the erase head 13, fewer stations are necessary to the shell formation. Thus, at station 2 the peripheral flanging 101' is outlined and the material which will form the bosses 31 and 33, as well as the coil supports, is generally embossed outwardly, as at 103 and 105. Station 3 permits forming of the coil supporting structure from the embossed material 103 and 105 in the form of the inwardly turned and depending angles 107 and 109, which also serve as the lower portions of the magnetic paths for the respective coils fitted thereon (not shown).

Station 4 is provided for restriking and severing the housing 71. Of course, for the erase head, also, the stamping and drawing could be done progressively rather than in the single die station described.

The two mated housings 71 are now adapted for assembly as the erase head 13 of FIG. 2. The coils (not shown) are disposed upon the legs 121 of a generally U-shaped thin magnetic member, as shown in dotted outline at 125 and 127. The coils are rested upon the horizontal sections of the angles 107 and 109 with the legs 121 of the high permeable magnetic member 123 being sandwiched between opposed angles 107 and 109 as the mating halves 71 are brought together. Also, the non-magnetic gap defining structure inserts 131 and 133 are set between the upper edges of the housings 71 to provide a pair of gaps at spaced locations when the uppermost (horizontal) sections of the magnetic member 123 and non-magnetic members 131 and 133 are finished off in the form of the gaps 19 and 21, as seen in FIG. 2. The internal components are encapsulated into the housings 71 to affix them into position prior to finishing off the upper sections thereof to form the gaps.

It may thus be appreciated that the magnetic paths for the coils 127 and 128 are upwardly along the legs 121, respectively, with return paths being back through the outer shells 71 and via the angles 107 and 109 to the magnetic member 123. During assembly of the shells 71, the spacers 131 and 133 and magnetic member 123 are all held in position by their upper edges through a suitable fixture in precise alinement with the bosses 31 and 33 such that the latter may be used to index to the gaps formed by the non-magnetic inserts 131 and 133.

During the stamping operation the mounting holes 141 are formed to receive the screws 46 (FIG. 1) when the erase head 13 is operatively connected to the record head 11. It should be noted that the holes 141 are slightly larger than the screws 46 in order that the actual indexing may be achieved by the bosses 31 and 33 being received in the slots 23 and 25 of the head 11. Tightening of the screws 46 then maintains this operative relation with the erase head gaps 19 and 21 in precise alinement with the record head gaps 15 and 17.

It will be obvious from the foregoing assembly that a further erase head may be added to the structure of FIG. 1 by the same screws 46 to provide a multiple head array consisting of an erase head, a record and/or playback head and an erase head. Alternatively, a further record head may be added to the visible front surface of the erase head 13 in FIG. 1 to provide an array of a record-erase and record head, the latter having particular application to bi-directional tape devices.

It will further be apparent that the principles herein employed may be incorporated into record or erase heads having more than two gaps each, with such multiple gap devices finding increasing use in industrial applications today.

While doubtless several types of flux producing components could be employed in the housings of head 11, the assembly of suitable specific components will now be described in connection with FIG. 9. The outermost elements of the internal assembly are the non-magnetic plates 251 and 253 which may be of copper, for example, and are provided to close the well in the respective housings 43. These plates, which act as outer magnetic isolators when in position, may include spaced tabs, such as 253, adapted to fit within the slots, such as 223 and 225. The plates 251 and 253 are epoxied to the inner surfaces of the housings 43.

The inner magnetic shells, shown as the U-shaped semi-boxes 261, 262, 263 and 264 are epoxied to the isolators 251 and 253. When these parts are butted together they form the inner magnetic shielding due to the high permeability material from which they are stamped.

Within these inner shielding components 261–264 there is disposed non-magnetic inner isolators, shown as the copper angles 265 and 266 and 267 and 268. These latter copper isolators insure against magnetic contact between the inner shielding boxing 261–264 and the pole pieces 47.

Figure 9:
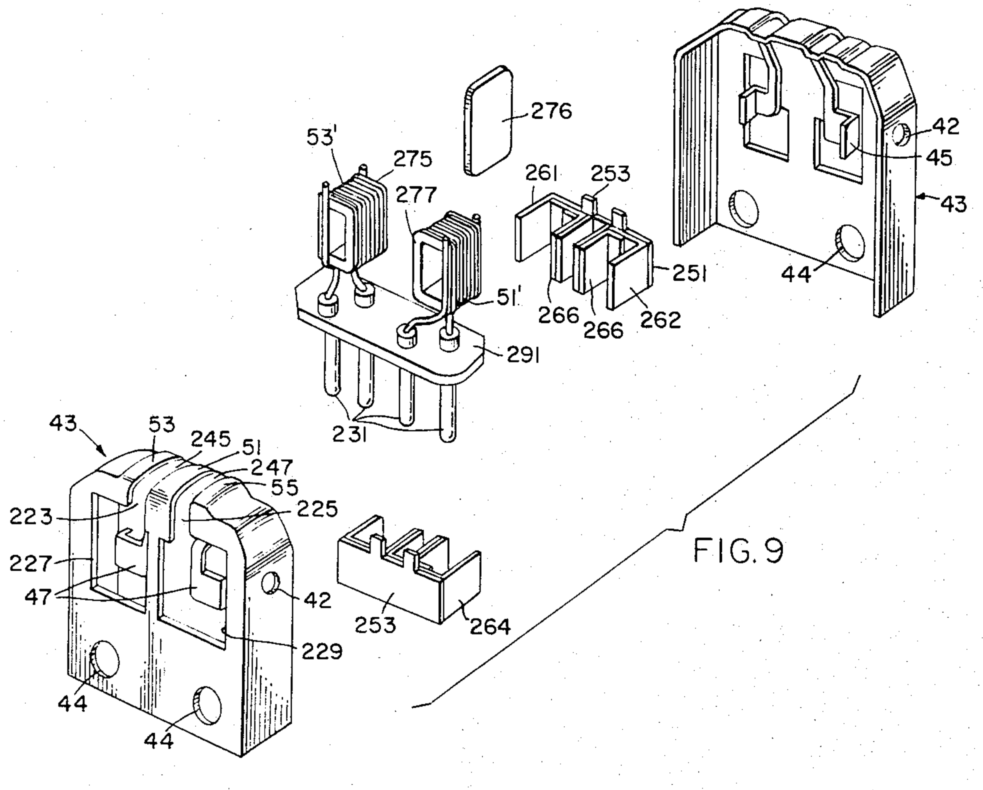
FIG. 9 shows the components of record head 11 in exploded perspective to illustrate the assembly thereof.

The build-up of inner components actually serves to form a rigid internal structure and may be accomplished in the manner of the sub-combination build-up as shown in FIG. 9, wherein the copper isolator 51 has secured thereto high permeability boxing 61 and 62, in turn containing the inner copper isolators 65 and 66 attached thereto. Alternately, these parts may be affixed to the housing and built up from component to component through epoxy or otherwise suitably joined to form a rigid structure.

The innermost sub-assembly is that of the coils 51' and 53' comprising fine wire wound upon nylon bobbins 275 and 277.

The winding wire of coils 51' and 53' is soldered or otherwise affixed to one of the heavier supporting wires and then wound around the bobbin and the other end affixed to the other supporting wire.

The heavy supporting wires are brought out to the terminals 231 for external connection to the finely wound coils, an insulating enclosure spacer 291 of, for example, phenolic, serves to carry this sub-combination and to close the housing.

The sub-assembly of the coils is fitted into the housings with the pole piece cores 45 receiving the coils. The opposite housing 43 is closed upon this structure such that its pole piece cores 45 enter the coils to form abutting engagement with the opposed cores.

The thus-assembled housings are held in a jig or fixture and the components are encapsulated by introducing epoxy or the like into the interior of the housings in the spacings created by the absence of normal corners on the phenolic spacer 291.

An optional center shield 276, of high permeable material may be inserted prior to encapsulation.

Whether or not shield 276 is employed, the exposed surfaces of all edges of the components shown including the peripheral edging of the housings 43, are lapped to define a common plane. The opposite housing and its components are similarly treated so that abutting relation will be achieved when the housings are brought together in final assembly.

Also, when the two housings are brought together, a conventional gap spacer (not shown) of non-magnetic material is inserted (or other conventional gap depositing or plating is employed) to maintain the gaps in the magnetic pole piece structures.

After the encapsulating material has set, the now joined housings are lapped or finished on the tape contact or operative face to the configuration of FIG. 3 to constitute the final head. This finishing is sufficient to remove the embossed areas 51, 53 and 55 from head 11 and the corresponding areas from the other (half) housing to expose the pole pieces 15 and 17. The finishing is continued uniformly until desired electrical characteristics are achieved, which processing successively exposes larger pole face areas 15 and 17.

By visual observation some control is exercised over this processing and in the event the face areas exposed exceed predetermined sizes, the head is discarded because it is apparent that a minimum gap depth is not preserved, thereby facilitating quality control.

In final alinement, the gaps in the pole faces 15 and 17 lie between parallel lines drawn between opposed indexing slots, as 23 to its counterpart and 25 to its counterpart. The magnetic gap width conforms to the spacing between the parallel lines because the pole piece widths are the same as the slot widths.

Figure 10:
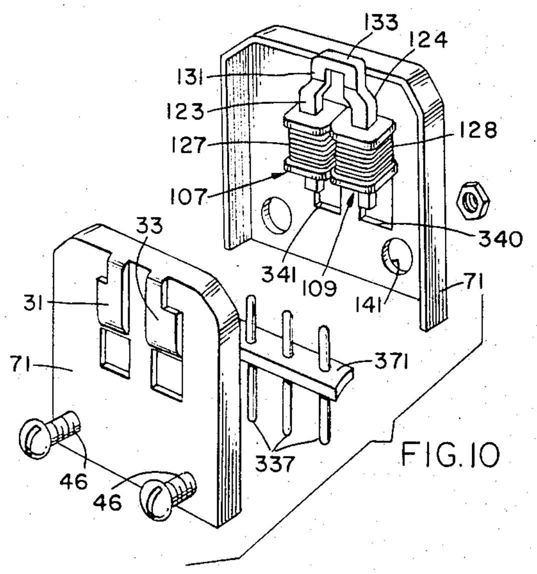
FIG. 10 is an exploded view in perspective of the erase head 13 showing the components thereof for assembly.

For purposes of assembly of the erase head 13, as shown in FIG. 10, the inwardly extending projections or tabs 107 and 109 of the housings 71 are useful. In the die formation, the projections 107 and 109 are punched from the material of the housing 15, leaving the apertures 340 and 341. Forming of these tabs or projections gives the right angle appearance wherein a portion of each tab is inwardly turned and its extreme portion depends therefrom. A pair of identical and similarly situated tabs (not shown) is included in the other housing. These four projections cooperate in providing platforms upon which the electrical coils 127 and 128 are seated and also act to close the magnetic path for these coils.

The magnetic cores or pole pieces adapted to be gripped between the projections of the housings are preferably initially in the U-shaped configurations, shown at 123 and 124. The magnetic configurations 123 and 124 are inserted through the coils 127 and 128 in adjacent relationship and the coils are rested upon the projections 107 and 109, for assembly, as best seen in FIG. 10.

The non-magnetic spacers 131 and 133 of copper or brass, for example, are disposed between the edges of the housings 71 and the abutting magnetic configurations 131 and 133 for assembly. It will be seen that the pole piece structures and spacers project beyond the common plane or face, formed when the housings are brought together. It is these projecting extremities which are gripped by the jig and fixtures (not shown) for precisely alining the upriser portions of the spacers and pole piece structures defining the gaps with the indexing bosses 31 and 37 such that the gaps to be formed by the removal of the horizontal reaches or integral connections between the vertical uprisers of the spacers and magnetic pole pieces are accurately indexed thereto.

A phenolic or the like closure member 371, with electrical terminals 373 set therein, is disposed in the open end of the box-like configuration formed by the housings and the coils are suitably connected thereto.

Following assembly of the structure, the internal components are epoxied in position, a suitable resin being poured through the arcuate end of the phenolic spacer 371 and the shell formed by the housing and allowed to harden to maintain alinement during the subsequent finishing of the head. It should be noted that the protruding portions of the spacer and magnetic configurations are finished off to open up the U-shaped configurations thereby separating the gaps to comprise a two-track erase head. Obviously the principles explained herein will encompass a monaural or other type single track (or even double track) erase head and the U-shaped configurations will be dispensed with, being replaceable by linear magnetic cores and spacers for assembly.

Figure 11:
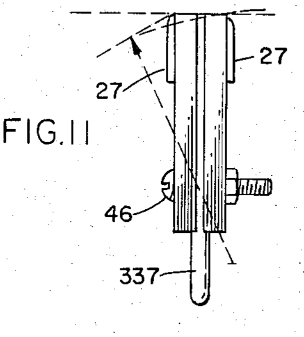
FIG. 11 is a view in elevation of the erase head to show the radiusing off thereof to permit tape wrap.

During finishing of the erase head, the upper or operative face, including the gaps, may be radiused off center (FIG. 11) with the cutting or radiusing being on the side of the head to be disposed away from the record head. The center for finishing is offset only a fraction of an inch, for example ⅛ of an inch, and thus the showing of FIG. 11 is exaggerated.

Other and further embodiments and arrangements of the invention will occur to those skilled in the art, and accordingly, it is intended that the invention not be limited by the scope of the showing, but rather by the appended claims.

What I claim is:

1. A method of making separate erase and record-playback heads having magnetic housings indexable together for precise gap alinement comprising the steps of: peripherally inwardly flanging a blank of material having magnetic permeability along the edges thereof; outwardly embossing said blank on its back wall to an edge thereof to comprise a housing; associating two housings in opposed relation with the flanges confronting each other and the bosses extending outwardly of the housings with non-magnetic material between the flanges in alinement with the bosses to form an enclosure about flux producing means to comprise an erase head; peripherally flanging a blank of material having magnetic permeability along three edges thereof; embossing outwardly a portion of the peripheral flange along one edge thereof; partially cutting and forming pole pieces from the material with integral connection maintained at the edge of said portion; the cutting and forming disposing the pole pieces in alinement with the slots from which they are cut to comprise a housing; disposing flux producing means on the pole pieces; associating a pair of said last mentioned housings to contain said flux producing means; filling the housing enclosure formed by the association with epoxy resin; curing said resin; finishing off the said embossed portions of said last mentioned housings to disconnect the pole pieces from the housings to comprise a record-playback head; and associating the erase head and record-playback head with the bosses of the former employed in the slots of the latter.

2. The process of claim 1, including radiusing off-center of the confronting flanges having the non-magnetic material in alinement with the bosses of the erase head to permit tape wrap when the erase head and record-playback head are combined.

3. A method of making magnetic housings for separate erase and record-playback heads indexable together for precise gap alinement comprising the steps of: partially peripherally flanging erase and record-playback head blanks of material having a magnetic permeability to form housings having flanged edge walls embossing the erase head blank outwardly and oppositely to the flanges in predetermined locations extending to an edge wall to provide indexing structure on the housing; partially cutting and forming inwardly portions of the blank to comprise partial magnetic pathways in conjunction with the blank; disposing non-magnetic material in said pathways in alinement with the embossed indexing structure; disposing magnetic pole piece means between the non-magnetic material and the portions to complete the magnetic pathways; associating a pair of housings to form an enclosure about flux producing means; interlinking said pole piece means; filling said housings with epoxy resin and curing said resin to form a permanent head; partially cutting and forming pole piece structures inwardly of the record-playback head peripherally flanged housings; forming non-magnetic gaps in alinement with the slots from which the pole piece structures are cut; associating a pair of record-playback head housings to form an enclosure about flux producing means for the pole piece structures; separating the pole piece structures from the housing while maintaining the alinement with its slots; and filling said last mentioned housings with epoxy resin and curing said resin to form a permanent record-playback head, and associating the erase head and record-playback head with the bosses of the former employed in the slots of the latter.

4. A method of making separate indexable magnetic erase heads and magnetic record-playback heads each with assembled components including flux producing coils disposed internally thereof, comprising in combination, stamping and die forming magnetically permeable blanks into peripherally edged housings adapted for abutting engagement along the peripheral edges thereof; cutting pole pieces from the housings in cantilever fashion with ends thereof remaining in attachment with the blanks generally centrally of the peripheral edges thereof; embossing a generally central region of the peripheral edges outwardly of the blanks; assembling into said housings said components; abutting said housings with the peripheral flanged edges in contact; filling the housings with epoxy resin; curing the epoxy resin to fix the position of said components to form a permanent head; finishing away the embossed peripheral regions to leave a face with said ends of the pole pieces exposed and isolated; forming the erase head from blanks of material having magnetic permeability by punching and die stamping each blank to form peripheral flanges along three sides thereof with bosses protruding out of the blank in the direction opposite the flanges and disposed near the face flange; assembling said components into a pair of said housings; locating non-magnetic spacers between the pair of housings and in alinement with the bosses thereof; said components including pole pieces in alinement with said bosses at said face; retaining said housings in parallel relation separated by the spacers and pole pieces while filling said housings with epoxy resin; curing the resin to form a permanently assembled head; finishing off said face and pole pieces and associating the erase head and record-playback head with the bosses of the former employed in the slots of the latter.

References Cited

UNITED STATES PATENTS

| | | | |
|---|---|---|---|
| 3,221,314 | 11/1965 | Sims | 179—100.2 |
| 3,222,461 | 12/1965 | Wood et al. | 340—174.1 |

JOHN F. CAMPBELL, *Primary Examiner.*

R. W. CHURCH, *Assistant Examiner.*